Aug. 21, 1951 — C. C. MAU — 2,564,811
ANIMAL TRAP
Filed April 29, 1949 — 3 Sheets-Sheet 1
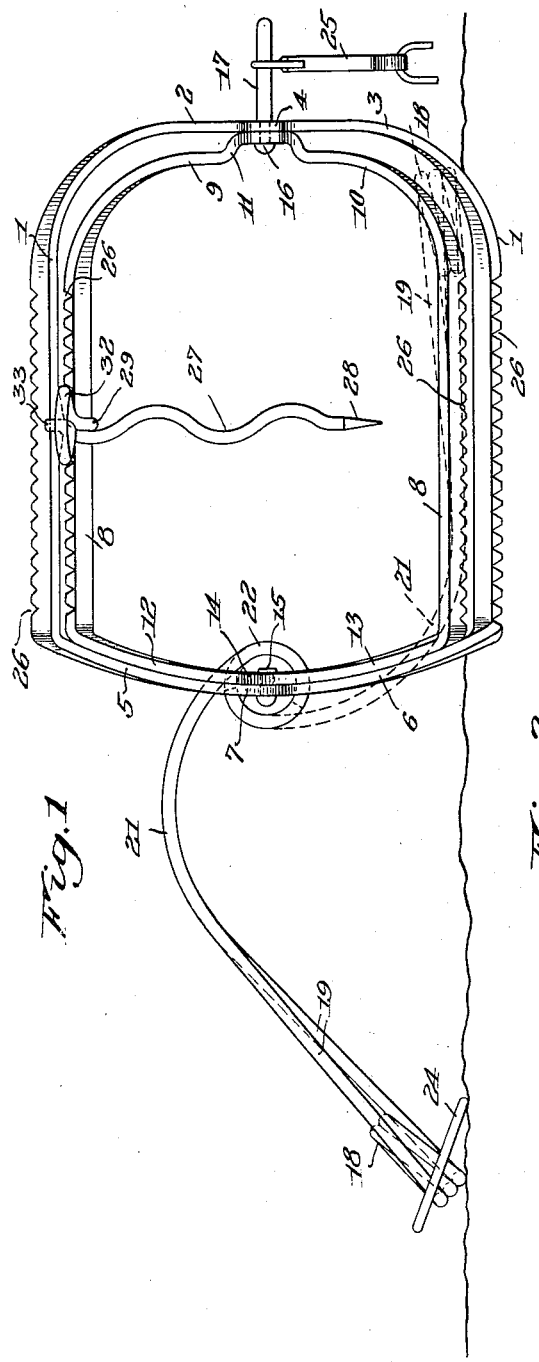
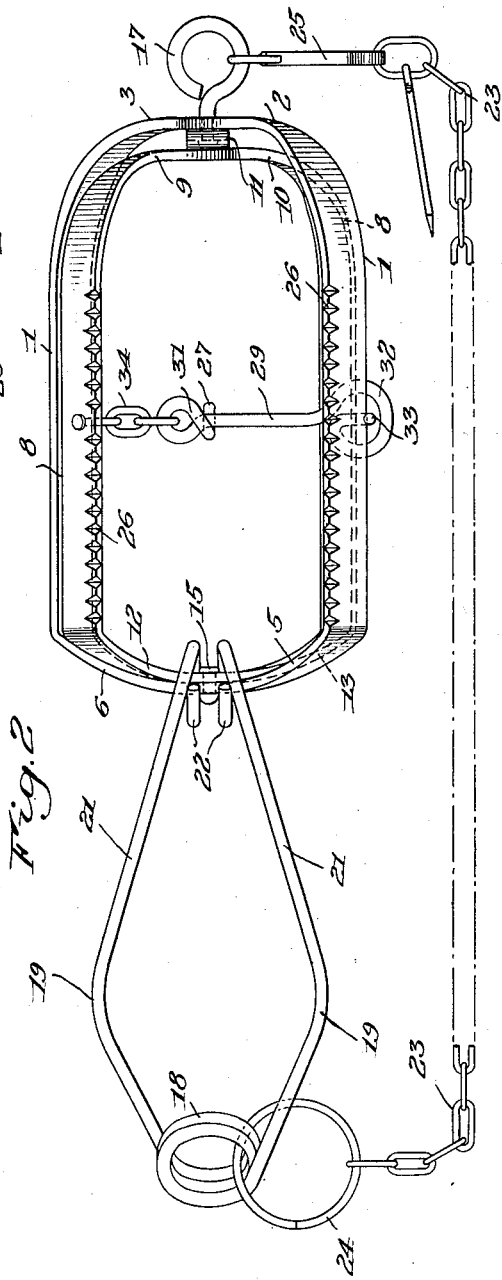
INVENTOR.
Clayton C. Mau
BY Harold E. Stonebrake
his Attorney Aug. 21, 1951   C. C. MAU   2,564,811
ANIMAL TRAP
Filed April 29, 1949   3 Sheets-Sheet 2
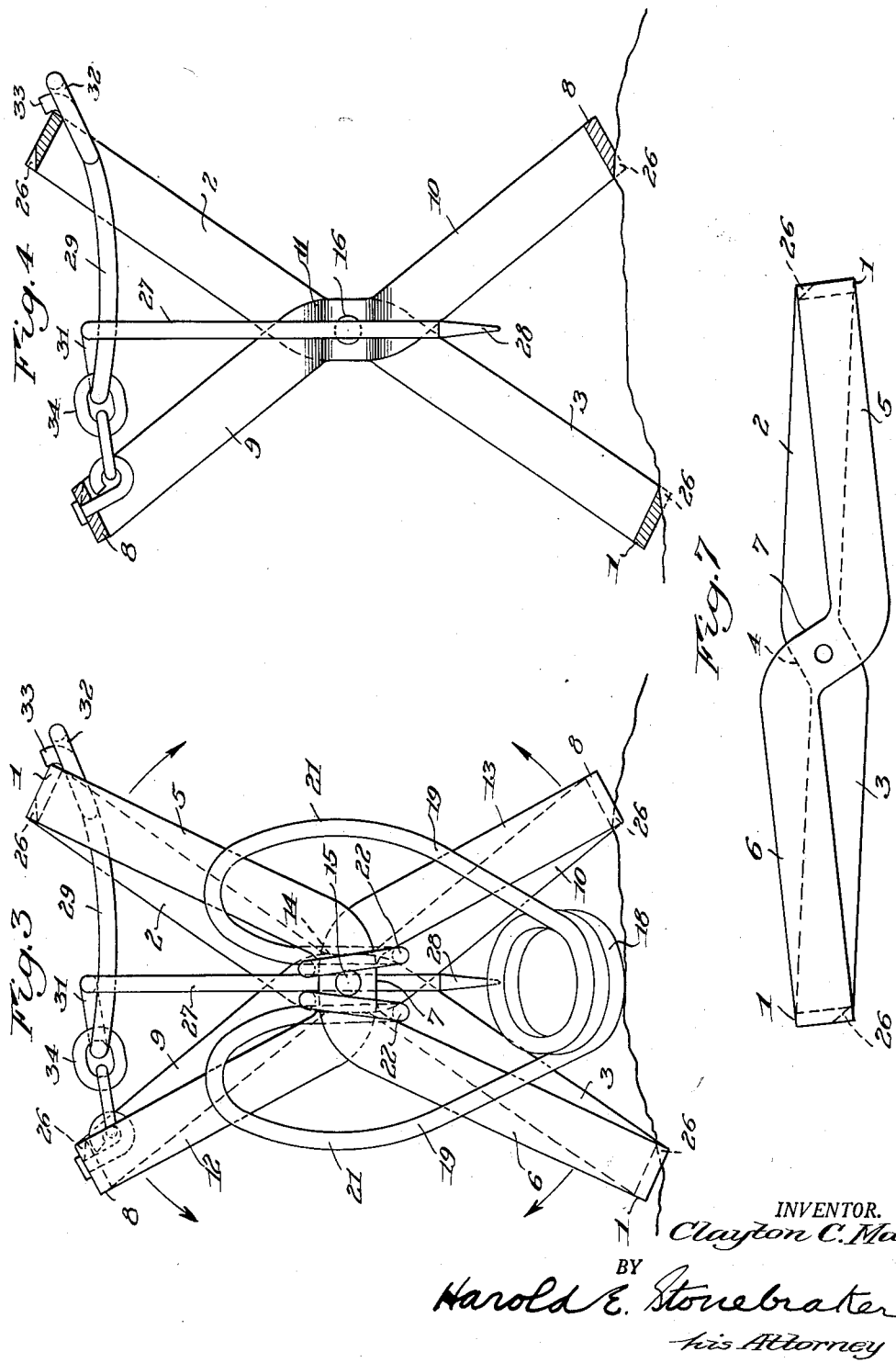
INVENTOR.
Clayton C. Mau
BY Harold E. Stonebraker,
his Attorney

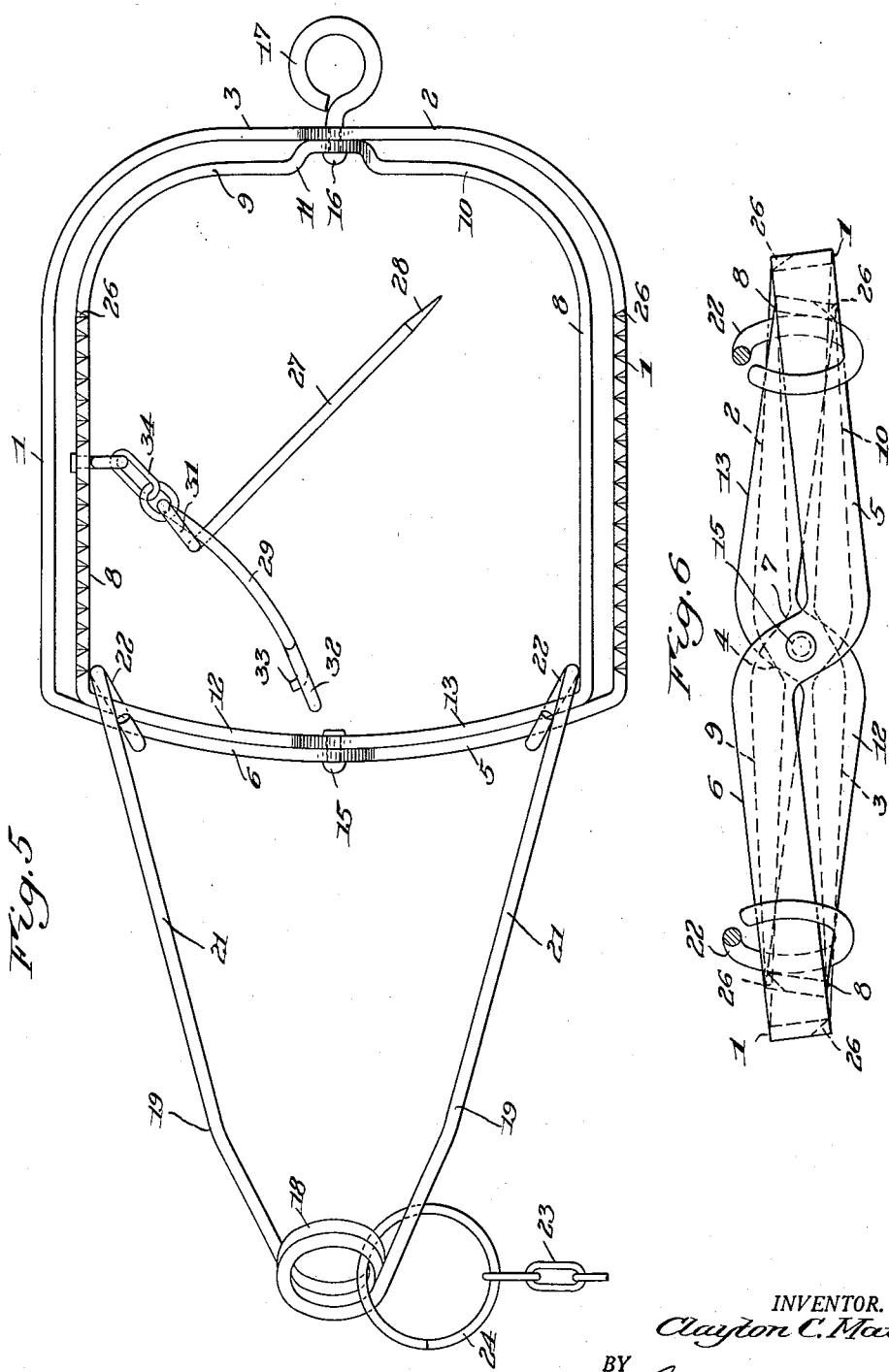

Patented Aug. 21, 1951

2,564,811

UNITED STATES PATENT OFFICE 2,564,811

ANIMAL TRAP

Clayton C. Mau, Geneseo, N. Y.

Application April 29, 1949, Serial No. 90,448

9 Claims. (Cl. 43—90)

This invention relates to an animal trap of the general type including a pair of coacting spring-actuated loop-shaped jaws between which the animal is caught, and it has for its purpose to afford a simple structure that can be economically manufactured and is useful in trapping muskrats, skunks, and other small animals.

A particular purpose of the invention is to afford an arrangement of jaws and a trigger mechanism so constructed and related to the jaws that the trigger is actuated by the head or body of the animal instead of by a foot, so as to insure breaking its neck and instantly killing the animal instead of merely gripping a foot or leg as in most conventional traps.

Another object of the invention is to afford a trigger and detent mechanism located centrally of the longitudinal axis of the trap for holding the jaws in set position, and arranged to be released by a sidewise or lateral movement of the trigger and a tilting movement of the detent as the animal walks through the trap to one side of the trigger or laterally moves the baited trigger, and to provide detent means which can be quickly adjusted to vary the sensitivity of the trap and which cooperates with the jaws in such a way as to prevent accidental or unintentional springing of the trap and to be operated only by an animal laterally moving the baited trigger.

A further purpose of the invention is to afford a trap embodying a pair of pivotally connected loop-shaped jaws arranged one within the other and into or through which the animal passes to spring the trap, combined with an actuating spring carried by the jaws and which can readily be manipulated when setting the trap.

Still an additional object of the invention is to afford a wire actuating spring of approximately the length of the trap, including arms supported on and movable along the jaws at one end thereof for actuating them and foldable around the end portions of the jaws when the trap is set to permit locating the spring between the ends of the jaws at one side whereby the trap can be positioned in a hole in the ground so that an animal entering or leaving the hole must pass through the trap and in lateral contact with the trigger.

Another purpose of the invention is to afford a wire actuating spring coiled at its outer end and including arms connected to the jaws, the arms being bent in a direction transversely of the coil to increase the power of the spring and to permit readily fastening the trap around a tree, stump, post, or other object and securing it in such position by means of a chain adjustably fastened to the coiled end of the spring and to or through the opposite end of the trap.

An additional object of the invention is to afford a jaw construction that insures a firm gripping action of the trap against the ground, either on a level or uneven surface, in a hole, or against a tree or other surface when fastened in position.

To these and other ends, the invention consists in the construction and arrangement of parts that will appear clearly from the following description when read in conjunction with the accompanying drawings, the novel features being pointed out in the claims following the specification.

In the drawings:

Fig. 1 is a view in side elevation of a trap constructed in accordance with a preferred embodiment of the invention, showing the jaws in set position and the actuating spring in its outermost position in full lines and folded between the jaws in dotted lines in the position it occupies when the trap is to be inserted into a hole;

Fig. 2 is a top plan view of the parts as shown in Fig. 1;

Fig. 3 is a view in end elevation of the same;

Fig. 4 is a transverse vertical sectional view with parts in the same position as in Fig. 3;

Fig. 5 is a top plan view showing the position of the jaws before being set;

Fig. 6 is a view in end elevation of the parts as illustrated in Fig. 5, and

Fig. 7 is a view similar to Fig. 6 with parts omitted.

Referring more particularly to the drawings in which like reference numerals throughout the several views refer to the same parts, there is provided an outer loop-shaped jaw of metal bar stock having a width of approximately one-half inch and a thickness of approximately one-eighth inch and including side or gripping portions 1, an end portion that is reversely curved to afford the oppositely extending portions 2 and 3 and a transverse central portion 4, and a convex opposite end portion that is reversely curved to afford the oppositely extending portions 5 and 6 connected by the transverse central portion 7.

The side or gripping portions 8 of the inner jaw are located within the previously described outer jaw, the end portion of the inner jaw being reversely curved to afford the end portions 9 and 10 connected by the central transverse and outwardly projecting protuberance 11, while the opposite end of the inner jaw is reversely curved to afford the curved end portions 12 and 13 connected by the central transverse portion 14. Each end portion is curved oppositely to the other end portion of the same jaw and also oppositely to the adjacent end portion of the other jaw, in order to enable effective operation by the spring to be described presently and proper spacing between the jaws when closed.

The inner and outer jaws are pivotally connected by a pin or rivet 15 connecting the central portions 7 and 14 at the inner ends of the outer and inner jaws respectively and a pin or rivet 16 connecting the central portions 4 and 11 at the outer ends of the outer and inner jaws respectively, the rivet or pin 16 being rigidly connected to or formed into an eye 17 adapted to turn on the jaws for a purpose that will appear hereinafter.

The inner jaw is so proportioned in relation to the outer jaw that when the trap is sprung and the jaws moved to their released position, the inner jaw is spaced approximately a quarter of an inch or more from the outer jaw at all points between the pivotal connections 16 at the outer end of the trap and the inner end portions of the jaws. This spacing between the jaws is of such a character that a foot or leg of an animal is not likely to be caught therebetween, but the animal is caught when the trap is sprung by a shearing action of the jaws in spaced parallel planes, causing the neck of the animal to be broken and usually resulting in instant death.

The jaws are held in set position, shown in Figs. 1 to 4, by the trigger and detent means to be described presently, and when the trap is sprung, the jaws are actuated from set position to the released position illustrated in Figs. 5 and 6 by an elongated stiff wire actuating spring that includes an integral coil 18 at its outer end and arms 19 that are curved or bent as shown at 21 in a direction generally transversely of a plane of a convolution of the coil 18, and are provided at their inner ends with circular terminal connecting portions 22, one of which slides on the end portions 5 and 13 of the jaws and the other of which slides on the end portions 6 and 12 of the jaws from the innermost position occupied when the jaws are set, as shown in Figs. 1 to 4, to the outermost position as illustrated in Fig. 5 when the trap is sprung.

The actuating spring is of a length approximately as great as that of the jaws and is curved to permit its being folded to occupy a position between the jaws and between the ends thereof, as shown in Fig. 1 in dotted lines, when the trap is set and it is desired to position it in a hole in the ground where space is limited, or it is purposed to have the trap occupy substantially the entire area of the hole so that an animal entering or leaving must go through the enclosure formed by the trap jaws and engage the trigger to be described presently.

The curved portions 21 of the arms of the spring serve a double purpose, namely, to increase the power of the spring due to the torsion resulting from the twisted portions 19 when the trap is set and the spring compressed in addition to the expansion of coil 18, and also to permit the spring to be secured around the trunk of a tree, post, or other fixed object where it is desirable to fasten the trap in a stationary position. To accomplish this there is provided a flexible connection or chain 23 suitably attached by ring 24 to the coil 18 at the outer end of the spring and having at its opposite end a snap fastener 25 that is attachable to the eye 17. By securing the trap around a tree or other object and fastening the chain to the eye 17, or pulling the chain through the eye 17 and fastening the snap to any convenient link of the same, the chain can then be tightened by turning the eye 17 to twist the chain and thereby shorten the same, and the friction of the eye 17 in the trap is sufficient to hold the twisted chain and to retain the trap in place.

In order to effect a firm frictional engagement between the jaws of the trap and the surface of the ground when resting thereon, or to prevent slipping when secured to a tree or other object, the side portions 1 and 8 of the jaws are serrated along the non-gripping edges that are exposed to the ground or other supporting surface when the trap is in set position, such serrations being indicated at 26 and arranged for engagement with the ground as indicated in Figs. 3 and 4 when the trap is set.

In order to set the trap, the inner ends or curved portions 21 of the spring are manually gripped or pressed together toward the center of the inner end portions of the jaws, as shown in Fig. 2, whereupon the jaws can be moved from an approximately parallel position to the position illustrated in Figs. 3 and 4 in which they are at an angle of approximately 60° to each other, and the jaws are held in this position by a trigger and detent means that will now be described in detail.

Referring to Figs. 3 and 4, the trigger and detent mechanism include an integral or rigid member preferably formed of wire and consisting of an undulating trigger 27 having a pointed end 28 and terminating at its opposite end in a curved arm 29 connected to the trigger 27 by means of the loop 31 and terminating at its outer end in an integral circular supporting portion 32, the extremity of which is formed into an upstanding detent or latch 33 at the center of the circular supporting portion 32, as shown in Figs. 2 and 3, while the loop 31 is flexibly connected by a chain or series of links 34 with the side portion of the inner jaw.

The trap is set by positioning trigger 27 and detent 33 as shown in Figs. 1 to 4, with detent 33 engaging the outer surface of the side portion of the outer jaw while the opposite end of the arm 29 and the trigger are connected to the inner jaw by the links 34. When in the set position, the circular connecting portions 22 of the spring surround the transverse central portions 7 and 14 of the jaws and are accommodated between the portions 5—12, and 6—13 of the respective jaws, see Fig. 3, thus enabling positioning the connecting portions 22 of the spring in close proximity to the pivot 15 when the trap is set. This arrangement makes it possible to use connecting portions 22 of smaller diameter than would otherwise be permissible, and reduces the spring tension on the jaws when the trap is set to a lesser degree than if the connection portions 22 were at a greater distance from the pivotal point 15. The reversely curved portions 2—3, 9—10, 5—6, and 12—13 also afford an arrangement whereby the gripping edges of the jaws are approximately parallel throughout their extent when in position to engage and kill an animal, thus eliminating the possibility of the foot of an animal being caught at a point near the pivotal connection between the jaws and preventing sufficient closing of the side portions of the jaws, since the jaws are spaced apart uniformly both at their side and end portions during the closing action. When the trap is set the detent 33 prevents the outer jaw from moving in a clockwise direction relatively to the inner jaw and holds the jaws against the action of the spring, which moves the jaws together as soon as the detent is released. When in the set position as thus described, the trigger 27 extends inwardly of the trap a distance about three-fourths the width of the trap, see Figs. 3 and 4, and at a point about the longitudinal center of the trap, see Figs. 1 and 2, while the opposite portions of the circular supporting portion 32 of the detent engage the gripping edge of the outer jaw on opposite sides of the detent 33. The circular portion 32 engages the edge of the jaw 1 at spaced points in opposite sides of detent 33 and can rock clockwise or anti-clockwise with reference to Fig. 1 on the edge of the jaw where it engages the latter. As trigger 27 is swung laterally to the right or left, see Fig. 1, the circular portion 32 is correspondingly rocked on the edge of jaw 1. If rocked clockwise, the right hand side of the circular portion 32 moves downwardly and if rocked anti-clockwise, the left hand side of the circular portion moves downwardly. In either case, the detent 33 is depressed by such rocking movement until it is disengaged from the jaw. Swinging movement of trigger 27 to the right or left of the position illustrated in Fig. 1 is permitted by the flexible connection 34 between the trigger and detent mechanism and the inner jaw. With this arrangement, a direct downward movement of trigger 27 and detent 33 is not required, and slight movement of trigger 27 to one side or the other as an animal brushes past or exerts a lateral pull on the trigger rocks the circular supporting portion 32 on which detent 33 is mounted, and thus effects sufficient downward movement of one side of the supporting portion to release the detent from the jaw. With this arrangement, as an animal enters or passes through the trap to either side of trigger 27, the head or body of the animal engaging the trigger swings the latter in a plane generally transverse to the direction of movement of the animal, such movement tilting the detent 33 and rocking the latter on one of the sides of the circular supporting portion 32 as a pivot sufficiently to release detent 33 from the jaw and permit the actuating spring to throw the jaws together and engage the neck of the animal between the gripping edges of the inner and outer jaws respectively.

The undulating form 27 of the trigger and the pointed end 28 are provided in order to enable baiting the trigger when desirable, and in order to vary the sensitivity of the trap or to offer more or less resistance to its release, the detent 33, which is formed at the end of the circular portion 32, can be bent slightly upwardly or downwardly, referring to Figs. 3 and 4, thus varying the extent or degree of engagement of the detent with the outer jaw which it engages, and making it possible to effect an adjustment readily for requiring greater or less movement of the trigger to release the jaws as desired.

The operation of the structure briefly is as follows: Assuming the jaws to be in the released position shown in Figs. 5 and 6, in order to set the trap, the curved portions 21 of the spring, see Figs. 1 and 5, are grasped and pressed toward each other and toward the centers of the inner end portions of the jaws, to release the latter from the action of the spring. Then while holding the spring compressed with one hand, the jaws can be turned relatively with the other hand of the operator until they are spread apart sufficiently to permit inserting the detent 33 behind the side portion of the outer jaw, as shown in Figs. 3 and 4, and, when in this position, the spring can be released, the jaws being held against movement under action of the spring by reason of the detent 33 resting against the side portion of the outer jaw while the other end of the trigger and detent unit is connected by links 34 to the inner jaw. The trap is then set and ready to be placed in any desired location, either on the ground, in a hole, or fastened around a tree or post, and when arranged as illustrated in Figs. 1, 3 and 4, upon movement of an animal into or through the trap to one side or the other of trigger 27, the latter is moved laterally, rocking the circular supporting portion 32 on the jaw and likewise the integrally connected detent 33 until the latter is moved far enough to disengage it from the outer jaw and permit the latter to move in a clockwise direction, relatively to Figs. 3 and 4, under the action of the spring, thus catching the neck of the animal between gripping portions of the inner and outer jaws as they move toward the position of Fig. 5. After the trap is set, if desirable to place it in a hole in the ground in the path of an animal entering or leaving the hole, the actuating spring is folded to the position illustrated in dotted lines in Fig. 1 where it is arranged between the non-gripping edges of the jaws, referring to Fig. 3, and also between the ends of the jaws, thus occupying no more space endwise than the jaws and in no way interfering with the operation of the trap as already described. If desirable to fasten the trap around a tree, post, or other stationary object, it is first set as in Fig. 1 and the chain 23 extending from coil 18 of the spring is wrapped around the tree and fastened through the eye 17, after which the latter is turned to draw the chain tightly and thus hold the trap in operative position. The chain can also be used to secure the coil end of the spring and the trap to any post, stationary object, or suitable ground anchor.

While the invention has been described with reference to the particular construction and arrangement herein shown, it is not confined to the exact details disclosed; and this application is intended to cover such modifications or departures as may come within the scope of the following claims.

I claim:

1. An animal trap comprising a pair of loop-shaped jaws arranged one within the other and including end portions which are pivotally connected at their centers, a wire actuating spring including a coiled portion at its outer end and arms terminating at the inner end of the spring in connecting portions that embrace and are slidable on said end portions of the jaws on opposite sides of their pivotal connection, said arms of the spring being curved in a direction generally transverse to the plane of a convolution of said coil and foldable around said end portions of the jaws to occupy a position between the jaws and between the ends thereof when the trap is set.

2. An animal trap comprising inner and outer loop-shaped jaws, pivotal connections between the end portions of the inner and outer jaws centrally thereof, said end portions including reversely curved portions, each end portion of each jaw being curved oppositely to the other end of the same jaw and oppositely to the adjacent end portion of the other jaw, and an actuating spring engageable with and movable along said end portions of the jaws on opposite sides of their pivotal connection and located between said reversely curved portions of opposite jaws when the trap is set.

3. An animal trap comprising inner and outer loop-shaped jaws, pivotal connections between the end portions of the inner and outer jaws centrally thereof, said end portions including reversely curved portions, each end portion of each jaw being curved oppositely to the other end of the same jaw and oppositely to the adjacent end portion of the other jaw, and a wire actuating spring including a coiled portion at its outer end and arms terminating at the inner end of the spring in connections embracing and slidable on said end portions of the jaws on opposite sides of their pivotal connection and located between said reversely curved portions of opposite jaws when the trap is set.

4. An animal trap comprising inner and outer loop-shaped jaws, pivotal connections between the end portions of the inner and outer jaws centrally thereof, the jaws comprising reversely curved end portions, each end portion of each jaw being curved oppositely to the other end of the same jaw and oppositely to the adjacent end portion of the other jaw, and a wire actuating spring including a coiled portion at its outer end and arms terminating at the inner end of the spring in connections embracing and slidable on the inner end portions of the jaws on opposite sides of their pivotal connection, said arms being curved in a direction generally transverse to the plane of a convolution of said coil and foldable around said end portions of the jaws to a position between the jaws and between the ends thereof when the trap is set.

5. An animal trap comprising inner and outer loop-shaped jaws arranged one within the other and pivotally connected, a spring comprising arms embracing and slidable on end portions of the jaws on opposite sides of their pivotal connection, trigger and detent means including an outwardly projecting detent positionable against an edge of one of the jaws, a supporting portion for the detent extending on opposite sides of the detent and engaging said edge of the jaw at spaced points from the detent whereby the detent is released from said edge by a rocking movement of the supporting portion on said edge, a trigger rigidly connected to said supporting portion and extending inwardly of the trap and positioned centrally endwise thereof when the trap is set, and a flexible connection between said supporting portion and the other of said jaws, said trigger when moved laterally effecting a corresponding rocking movement of said supporting portion on the edge of the jaw and disengagement of the detent from the jaw.

6. An animal trap comprising inner and outer loop-shaped jaws arranged one within the other and pivotally connected, a spring comprising arms embracing and slidable on end portions of the jaws on opposite sides of their pivotal connection, trigger and detent means including an outwardly projecting detent positionable against an edge of one of the jaws, a relatively wide supporting portion surrounding the detent and extending on opposite sides of the detent and engaging said edge of the jaw at spaced points from the detent whereby the detent is released from said edge by a rocking movement of the supporting portion on said edge, a trigger rigidly connected to said supporting portion and extending inwardly of the trap and positioned centrally endwise thereof when the trap is set, and a flexible connection between said supporting portion and the other of said jaws, said trigger when moved laterally effecting a corresponding rocking movement of said supporting portion on the edge of the jaw and disengagement of the detent from the jaw.

7. An animal trap comprising inner and outer loop-shaped jaws arranged one within the other and pivotally connected, a spring comprising arms embracing and slidable on end portions of the jaws on opposite sides of their pivotal connection, a wire trigger and detent member comprising an inwardly extending trigger, an integral loop at the outer end of the trigger, a flexible link connection between said loop and one of the jaws, an integral detent bar extending from said loop toward the other jaw when the trap is set, said detent bar terminating in an integral relatively wide supporting portion engaging the gripping edge of said other jaw at spaced points on opposite sides of the detent, and an integral detent at the center of said supporting portion extending outwardly therefrom and arranged for engagement with the edge of said other jaw, said trigger when moved laterally effecting a corresponding rocking movement of said supporting portion on the edge of the jaw and disengagement of the detent from the jaw.

8. An animal trap comprising a pair of loop-shaped jaws arranged one within the other and including pivotally connected end portions, a wire actuating spring including a coiled portion at its outer end and arms terminating at the inner end of the spring in connecting portions that embrace and are slidable on end portions of the jaws on opopsite sides of their pivotal connection, an eye rotatably mounted at the opposite end portions of the jaws at the point of their pivotal connection, and flexible fastening means having one end connected to said coil of the actuating spring and the other end adjustably engageable with said rotatable eye and acting to secure the trap around a support when set.

9. An animal trap comprising a pair of loop-shaped jaws arranged one within the other and including pivotally connected end portions, a wire actuating spring including a coiled portion at its outer end and arms terminating at the inner end of the spring in connecting portions that embrace and are slidable on end portions of the jaws on opposite sides of their pivotal connection, said arms of the spring being curved in a direction generally transverse to the plane of a convolution of said coil and foldable around said end portions of the jaws to occupy a position between the jaws and between the ends thereof, an eye rotatably mounted at the opposite end portions of the jaws at the point of their pivotal connection, and flexible fastening means having one end connected to said coil of the actuating spring and the other end adjustably engageable with said rotatable eye and acting to secure the trap around a support when set.

CLAYTON C. MAU.

REFERENCES CITED

The following references are of record in the file of this patent:

UNITED STATES PATENTS

| Number | Name | Date |
|---|---|---|
| 120,375 | Frost | Oct. 31, 1871 |
| 833,827 | Dawkins | Oct. 23, 1906 |
| 928,143 | McEwan | July 13, 1909 |
| 1,601,424 | Anderson | Sept. 28, 1926 |
| 2,496,393 | Hayden | Feb. 7, 1950 |

FOREIGN PATENTS

| Number | Country | Date |
|---|---|---|
| 1,718 | Sweden | June 18, 1889 |